Dec. 21, 1943.   J. C. CURTIS   2,337,312
CHUCK MECHANISM
Filed April 27, 1943    2 Sheets-Sheet 1

Inventor:
John C. Curtis.
by
Louis A. Maxson,
Atty.

Dec. 21, 1943.  J. C. CURTIS  2,337,312
CHUCK MECHANISM
Filed April 27, 1943   2 Sheets-Sheet 2
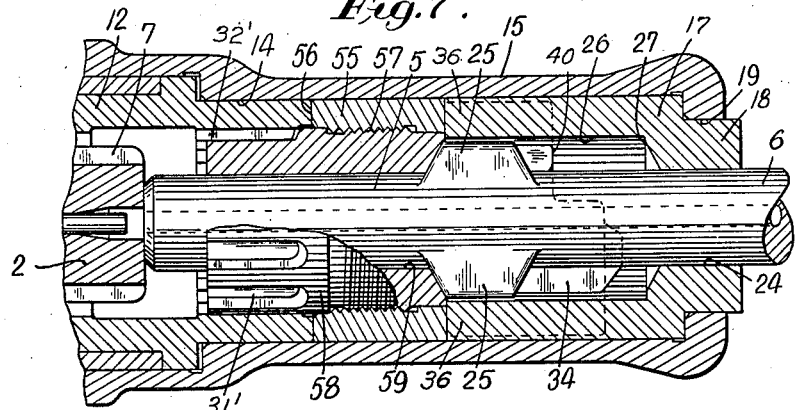
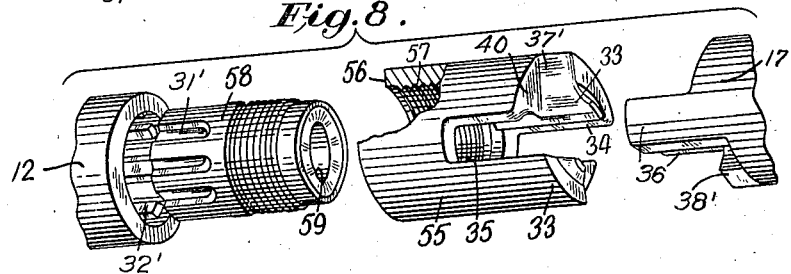
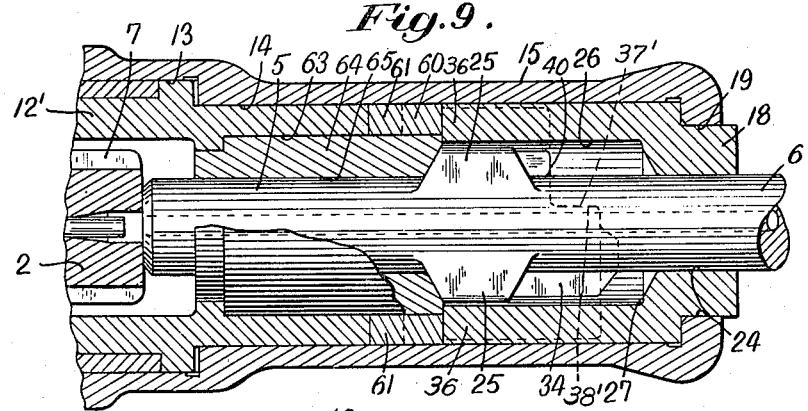
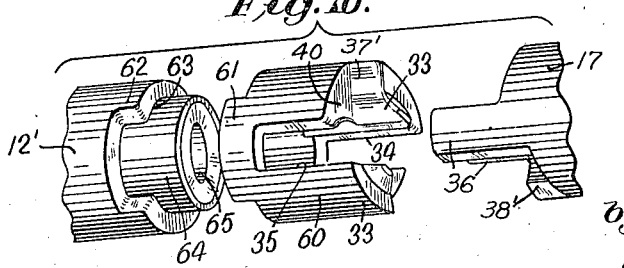
Inventor:
John C. Curtis.
by
Lewis A. Maxson,
atty.

Patented Dec. 21, 1943

2,337,312

UNITED STATES PATENT OFFICE 2,337,312

CHUCK MECHANISM

John C. Curtis, Claremont, N. H., assignor to Sullivan Machinery Company, a corporation of Massachusetts Application April 27, 1943, Serial No. 484,719

9 Claims. (Cl. 279—19.3)

This invention relates to chuck mechanisms, and more particularly to improvements in a chuck mechanism for the drill steel of a hammer rock drill.

It is customary to provide in a chuck mechanism for supporting and locking a drill steel in a rock drill of the hammer type, an opening at the forward end of the chuck through which the shank of a drill steel with lugs formed upon its sides may be inserted when the drill steel is turned to a certain position. Within the chuck are provided longitudinal grooves for receiving the lugs, and the grooves are of such angular extent throughout their lengths that the drill steel may be partially rotated when the lugs are in any of their positions between the ends of the grooves, to bring the lugs out of registry with the opening and into engagement with suitable abutments. With this arrangement, it is possible for the drill steel to turn appreciably within the chuck during operation of the drill, and it may at any time, except when driven by the chuck, turn into a position bringing the lugs into alinement with the opening. Rotary movement of the drill steel and its lugs within the grooves during operation of the drill causes considerable wear between the lugs and the parts of the chuck mechanism, and if the lugs are moved into position in alinement with the opening at the forward end of the chuck the drill steel may be inadvertently released. By providing a recess within which the lugs may be turned by partially rotating the drill steel when it is in only a certain position in the chuck, and providing grooves within which the lugs are received when the drill steel is in its normal position during operation of the drill, and which prevent substantial rotation of the drill steel in either direction, there is obtained a reduced wear and a locking of the drill that prevents its release. Furthermore, by providing the so-called locking member—the member which has the opening through which the shank and lugs of the drill steel are initially passed as the steel shank is being inserted in the chuck—with a circular chamber within which the lugs are receivable and rotatable, and providing on another, cooperating member projecting portions entering the circular recess and limiting the turning movement of the steel shank within the circular chamber and guiding the steel lugs into the desired position in grooves provided to receive them, and further providing, for example on such cooperating member, surfaces as it were forming an inner wall for the circular recess and aiding in positioning the lugs for turning, a very conveniently formed and satisfactory arrangement may be obtained.

It is an object of this invention to provide an improved rock drill chuck mechanism. It is another object of this invention to provide an improved chuck mechanism having means for holding the drill steel in a locked position during operation of the drill. It is still another object to provide in an improved chuck mechanism means for reducing the relative movement between the drill steel and parts of the chuck mechanism, thereby reducing the wear during operation of the drill. Still another object is to provide an improved drill steel chuck mechanism having improved means for supporting and driving the drill steel and for locking the drill steel within the chuck. It is also an object of this invention to provide a locking member having an opening through which the lugged shank of the drill steel may be inserted and a circular recess which receives the steel lugs and in which the lugs may be turned to lock the steel within the chuck. A further object is to provide an improved drill steel chuck wherein a driver member has portions projecting within the circular recess in the locking member to provide abutments for the steel lugs so that when the steel is turned into locked position in the chuck, the lugs rest against the abutments, and in which the abutments locate the lugs in registry with the grooves in the driver member, thereby enabling easy insertion of the steel lugs within the grooves. A still further object is to provide an improved drill steel chuck wherein an improved driver member provides surfaces to coact with a circularly recessed locking member to limit the rectilinear entering movement of the steel lugs into the recess. Still a further object is to provide an improved drill steel chuck in which an improved circularly recessed locking member has cooperating therewith an improved driver member having surfaces for limiting rectilinear insertion of the steel lugs and for guiding them as they rotate relative to said driver member, additional surfaces limiting the rotation of the lugs relative to said members, and lug receiving recesses positioned to receive the lugs by further rectilinear movement when their turning has been interrupted by said second surfaces. Yet another object is to provide a driver member of a novel design having grooves for receiving the steel lugs so that substantial rotation of the steel in either direction relative thereto is prevented. These and other objects of the invention will, however, hereinafter more fully appear.

In the accompanying drawings there are shown for purposes of illustration several forms which the invention may assume in practice.

In these drawings:

Fig. 7 is a longitudinal section similar to Fig. 1, illustrating a modified form of the invention.

Fig. 8 is a perspective view showing the chuck sleeve, chuck bushing, driver member and locking member of the improved chuck mechanism shown in Fig. 7, the parts being shown disassembled.

Fig. 9 is a longitudinal section similar to Fig. 7 showing another modified form of the invention.

Fig. 10 is a perspective view showing the chuck sleeve, chuck bushing, driver member and locking member of the improved chuck mechanism shown in Fig. 9, the parts being shown disassembled.

Figure 1:
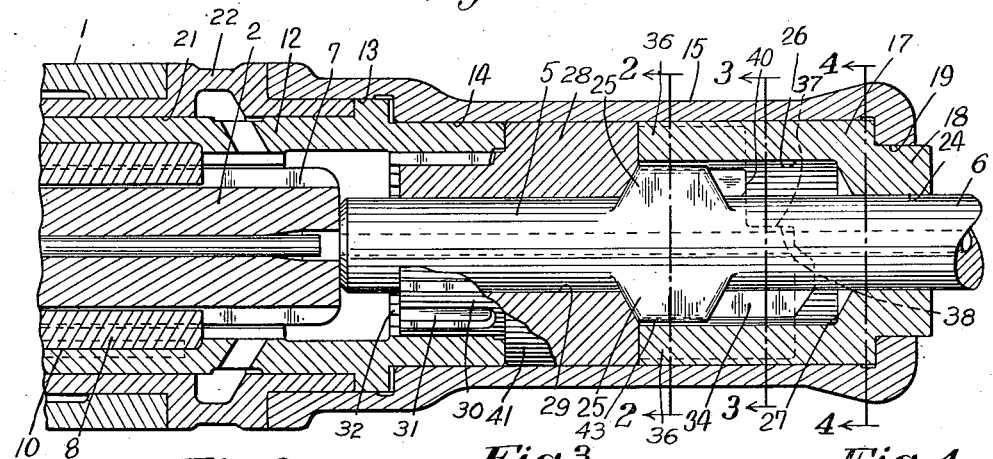
Fig. 1 is a longitudinal section, taken on line 1—1 of Fig. 2, through the forward portion of a rock drill within which an illustrative form of the improved chuck mechanism is embodied.

In the several illustrative embodiments of the invention the improved chuck mechanism is embodied in a hammer-type rock drill comprising a cylinder 1 containing a reciprocable hammer piston having a striking bar 2 adapted to deliver impact blows to the shank 5 of a conventional lugged drill steel 6. As is usual in rock drills, the hammer piston is rotated as it is reciprocated, and this rotative piston movement is transmitted to the drill steel so that as the latter is percussively actuated, it is at the same time rotated. The piston striking bar 2 is provided with longitudinal grooves 7 interlocked with straight lugs or vanes formed internally within a sleevelike chuck nut 8 secured at 10 within a chuck sleeve 12 rotatably mounted within bores 13 and 14 formed in a front chuck housing 15. Since the rock drill structure above described is well known to those skilled in the art further description thereof is herein unnecessary.

In the illustrative embodiment of the invention shown in Figs. 1 to 6 inclusive, arranged within the forward bore 14 of the chuck housing is a cylindric locking member or retaining ring 17 having a reduced portion 18 extending forwardly through an opening 19 at the forward end of the housing. The chuck sleeve is also rotatably mounted in a bore 21 in a member 22 arranged between the cylinder 1 and the chuck housing. Opening through the forward end of the retaining ring is a key opening 24 through which the drill steel shank and lugs 25 formed on the shank may be inserted. Within the rearward portion of the retaining ring is an enlarged, circular bore 26 for receiving the lugs 25 after they have been moved rearwardly through the key openings 24. An annular radially extending shoulder 27 is herein shown at the forward end of the bore 26. A driver member 28 is rotatably mounted in the chuck housing bore 14 intermediate the chuck sleeve 12 and locking member 17 and has a central bore 29 for receiving and supporting the drill steel shank 5 in a position to receive impact blows from the piston striking bar 2. The driver member 28 has a rearward annular projection 30 having external longitudinal grooves 31 which are slidingly interlocked with longitudinal keys 32 formed within the bore of the chuck sleeve 12. Thus the driver member 28 and the chuck sleeve 12 are interlockingly connected for rotation together. At the forward end of the driver member is a pair of diametrically opposite, parallel projections 33 extending forwardly within the circular bore 26 of the locking member, and these projections provide abutment surfaces 34 for engagement by the lugs of the drill steel shank when the drill steel is turned in the bore 26 to move the lugs out of alinement with the key opening 24. Extending rearwardly from the projections 33 are slots or grooves 35 formed in the driver member for receiving the lugs of the drill steel shank when they are moved into engagement with the abutment surfaces 34 and then moved rearwardly within the chuck. The slots or grooves are of such width that substantial turning of the drill steel in either direction relative to the driver member is prevented when the drill steel lugs are received in them and the drill steel is locked against release from the key opening 24.

Figure 2:
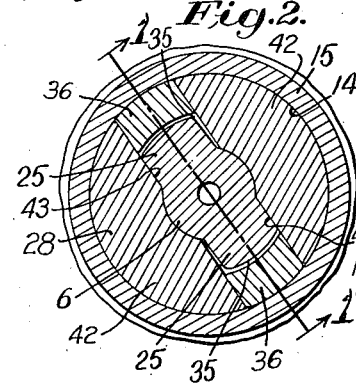
Fig. 2 is a cross sectional view taken on line 2—2 of Fig. 1.
Figure 3:
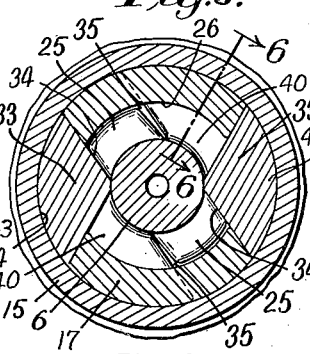
Fig. 3 is a cross sectional view taken on line 3—3 of Fig. 1.
Figure 4:
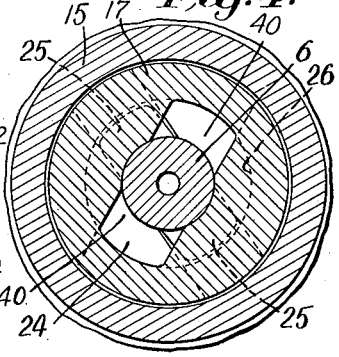
Fig. 4 is a cross sectional view taken on line 4—4 of Fig. 1.
Figure 5:
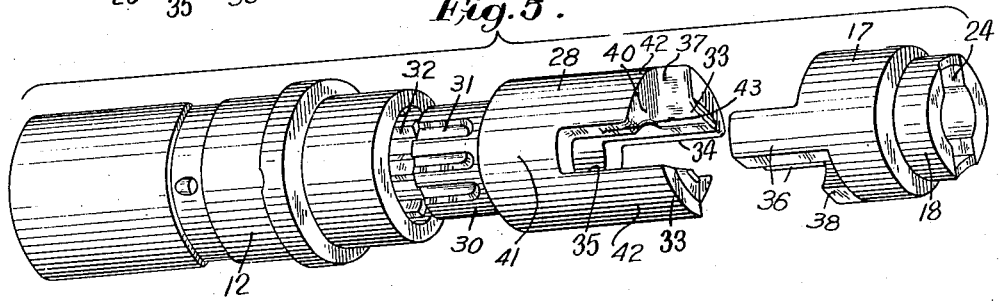
Fig. 5 is a perspective view showing the chuck sleeve, the driving member, and the locking member of the improved chuck mechanism, the parts being shown disassembled.
Figure 6:
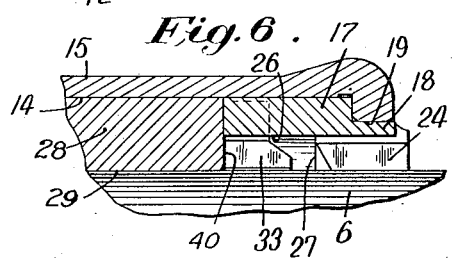
Fig. 6 is a detail sectional view taken on the line 6—6 of Fig. 3.

The locking member 17 has rearward projections 36 which are received in the grooves 35 at the outer sides of the steel lugs, as shown in Fig. 2, to provide closure members for the grooves. These projections 36 have outer bearing surfaces which fit the chuck housing bore. The driver member 28 and the locking member 17 are locked for rotation together by interlocking clutch jaws 37 and 38 respectively formed on the forward end of the driver member and the rearward end of the locking member.

The projections 33 on the driver member 28 are shown as being of such length that there is provided, between the forward end of the bore 26 in the retaining ring and forward surfaces 40 on the driver member at the base of the projections 33, a space that is of but slightly greater length than the lugs on the drill steel shank. As the drill steel lugs are moved through the key opening 24 they enter the bore 26 and are permitted to move rearwardly, before engaging the surfaces 40, only far enough to bring them completely within the bore so the drill steel can be rotated to bring the lugs against the abutment surfaces 34 on the projections 33. After the lugs have been moved against the abutment surfaces 34 they are in position to be received by the slots 35, and the drill steel can be moved rearwardly in the driver member 28 to a position for receiving the blows from the striking bar. The space within which the drill steel may be rotated may of course be varied in length, but to reduce the chances of an inadvertent release of the drill it is desirable to hold the length to a minimum. The driver member 28 may be noted to comprise an annular body portion 41 having forwardly projecting mutually opposite portions 42 spaced from each other by the slots 35, these slots providing driving surfaces 43 to engage and drive the steel lugs; and the portions 42 terminate, except for their projections 33, in the surfaces 40 as above noted, which limit the initial inserting movement of the steel.

In the modified embodiment shown in Figs. 7 and 8, the chuck sleeve, locking member and the interlocking connection between the driver member and locking member are similar to those shown in Fig. 1. In this construction a driver member 55 is rotatable within the chuck housing bore 14 and has an annular plane surface 56 at its rear end abutting the forward end of the chuck sleeve. The driver member is formed with a threaded bore 57, in which is threadedly secured a replaceable chuck bushing 58 having a central bore 59 for receiving and supporting the drill steel shank. The bushing has external longitudinal grooves 31' which are slidingly interlocked with internal keys 32' on the chuck sleeve. Thus the bushing 58 connects the driver member 55 and the chuck sleeve for rotation together. As in the embodiment above described, the driver member and locking member are locked for rotation together by interlocking clutch jaws 37' and 38' and the projections 33 extend within the bore 26 of the locking member 52. Likewise these projections provide abutment surfaces 34 for engagement with the lugs of the drill steel shank, and the driver member 55 has slots or grooves 35 for receiving the lugs on the drill steel shank.

In the modified embodiment shown in Figs. 9 and 10, the chuck sleeve, driver member and locking member are similar to those shown in Fig. 7. In this instance, however, a driver member 60 rotatable within the chuck housing bore is locked for rotation with a chuck sleeve 12' by interlocking clutch jaws 61 and 62. Pressed in a bore 63 in the chuck sleeve is a replaceable chuck bushing 64 having a central bore 65 for receiving and supporting the shank of the drill steel. The manners of locking the driver member and locking member for rotation together and for locking the drill steel within the chuck are in this embodiment similar to those above described.

As a result of this invention, it will be noted that an improved chuck mechanism has been provided wherein the drill steel is positively locked within the chuck during operation of the drill. It will further be noted that the drill steel is prevented from rotating appreciably within the chuck mechanism during operation of the drill, and the wearing of the parts is accordingly reduced. The mechanism is of rugged construction and may be easily assembled. In the several embodiments, the driver member has portions which extend forwardly within the circular recess in the locking member, and, of course, has relatively wide portions adapted closely to fit the steel shank at points between the driver grooves. Thus the wear on the driver member is kept at a minimum. By extending the projections on the driver member within the circular bore in the locking member, abutments are provided which, when the steel is turned into locked position, cause the locking lugs to be located in registry with the driver grooves enabling ready insertion of the steel shank within the chuck. By making the driver member and locking member in the novel manner shown in the several embodiments, forming of the parts and machining are made more easy. In each of the several illustrative forms of chuck mechanism shown there will be observed to be a locking member within which a chamber is provided in which the steel lugs may be rotated into locked position, and a driver member providing surfaces for limiting the insertion of the lugs rectilinearly, and other surfaces for limiting the turning movement of the lugs, and lug receiving recesses which the lugs may enter by rectilinear inward movement when they engage said second surfaces, and said driver member has integral with it or associated with it a steel shank receiving socket providing portion, and said driver member has directly, or through an intermediate element, a driving connection through which it is rotated, as by a chuck sleeve. These and other uses and advantages of the improved chuck mechanism will be clearly apparent to those skilled in the art.

While there are in this application specifically described several forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a drill steel chuck mechanism, a chuck housing, a driver member rotatable within said housing and having a central bore for receiving the shank of a drill steel and lateral grooves for receiving the lugs on the steel shank, said grooves preventing substantial rotation of the steel in either direction with respect to the driver member while permitting longitudinal reciprocation of the steel, a locking member rotatable within said housing and having a front key opening and a rearward circular bore, the steel lugs being insertable through said key opening into said circular bore and said steel lugs being rotatable in the circular bore to move out of registry with said key opening to lock the steel in the chuck mechanism, said driver member having clutch teeth interlocking with teeth of said locking member for locking the driver and locking members for rotation together and said driver member having parallel projections extending forwardly from the clutch teeth into said circular bore to provide stops for the steel lugs to locate the lugs in registry with said grooves when the steel is in locked position in the chuck mechanism, and the steel shank being movable rearwardly into the bore of the driver member when the lugs are in engagement with said projections and said grooves receiving the lugs as the steel is moved rearwardly.

2. In a chuck mechanism for supporting, rotating and retaining a lugged drill steel, the combination comprising a rotatable chuck sleeve carrying a member which provides a bore for receiving a drill steel shank, a driver member detachably connected to said chuck sleeve for rotation therewith and having a bore for receiving a portion of said first mentioned member and further having grooves for receiving the lugs of a drill steel and also having forwardly projecting portions certain sides of which are in alinement with certain walls of said grooves and the other sides of which are angularly spaced from the opposite walls of said grooves, said driver member having transverse surfaces extending between said last mentioned surfaces and said grooves, and a locking member having communicating shank and lug receiving openings through which the steel shank and lugs may be passed and a circular recess communicating with said openings in which said lugs are rotatable, said projecting portions extending into said recess for limiting the turning of the lugs therein and said transverse surfaces limiting inward movement of said lugs in said recess, and said driver member and said locking member detachably connected for rotation together with said grooves out of alinement with the lug receiving openings in said locking member.

3. In a chuck mechanism for supporting, rotating and retaining a lugged drill steel, the combination comprising a rotatable chuck sleeve, a driver unit having a portion providing a drill steel shank receiving bore detachably connected to said chuck sleeve for rotation therewith and said driver unit having also a portion having grooves for receiving the lugs of a drill steel and also having forwardly projecting portions certain sides of which are in alinement with certain walls of said grooves and the other sides of which are angularly spaced from the opposite walls of said grooves, said driver member having transverse surfaces extending between said last mentioned surfaces and said grooves, and a locking member having communicating shank and lug receiving openings through which the steel shank and lugs may be passed and a circular recess communicating with said openings in which said lugs are rotatable, said projecting portions extending into said recess for limiting the turning of the lugs therein and said transverse surfaces limiting inward movement of said lugs in said recess, and said driver unit and said locking member directly detachably connected for rotation together with said grooves out of alinement with the lug receiving openings in said locking member.

4. In a chuck mechanism for supporting, rotating and retaining a lugged drill steel, the combination comprising a rotatable chuck sleeve, a driver member detachably connected to said chuck sleeve for rotation therewith and having a bore for receiving a drill steel shank and further having grooves for receiving the lugs of a drill steel and also having forwardly projecting portions certain sides of which are in alinement with certain walls of said grooves and the other sides of which are angularly spaced from the opposite walls of said grooves, said driver member having transverse surfaces extending between said last mentioned surfaces and said grooves, and a locking member having a communicating shank and lug receiving openings through which the steel shank and lugs may be passed and a circular recess communicating with said openings in which said lugs are rotatable, said projecting portions extending into said recess for limiting the turning of the lugs therein and said transverse surfaces limiting inward movement of said lugs in said recess, and said driver member and said locking member detachably connected directly together for rotation together with said grooves out of alinement with the lug receiving openings in said locking member.

5. In a chuck mechanism for supporting, rotating and retaining a lugged drill steel, the combination comprising a rotatable chuck sleeve, a driver member for receiving a drill steel shank and having grooves for receiving the lugs of a drill steel and forwardly projecting portions certain sides of which are in alinement with certain walls of said grooves and the other sides of which are angularly spaced from the opposite walls of said grooves, said driver member having transverse surfaces extending between said last mentioned surfaces and said grooves, and a locking member having communicating shank and lug receiving openings through which the steel shank and lugs may be passed and a circular recess communicating with said openings in which the lugs are rotatable, said projecting portions extending into said recess for limiting the turning of the lugs therein and said transverse surfaces limiting inward movement of said lugs in said recess, said driver member arranged intermediate said chuck sleeve and said locking member and detachably connected and fixed against rotation relative to said sleeve and locking member with said grooves out of alinement with said lug receiving openings in said locking member.

6. In a chuck mechanism for supporting, rotating and retaining a lugged drill steel, the combination comprising a rotating chuck sleeve, a member rotating with said sleeve for receiving the shank and lug of a drill steel and having a circular recess therein for receiving the shank and lugs of the drill steel and within which the lugs are movable angularly relative to said member upon rotation of the drill steel, and means interposed between said sleeve and said member and detachably connected to each of the same for connecting said member and sleeve for rotation together, said means projecting into said recess and providing surfaces for limiting the angular movement of the lugs in said recess, said means also receiving the lugs and holding the drill steel against rotation relative to said member in a position out of contact with said surfaces.

7. In a chuck mechanism for supporting, rotating and retaining a lugged drill steel, the combination comprising a chuck housing having a bore for rotatably receiving steel supporting, steel rotating and steel retaining devices, a chuck sleeve rotatable in said bore, a retainer member rotatably supported in said bore and having intercommunicating openings for receiving the shank and lugs of a drill steel and rearwardly of said openings a circular recess in which the lugs of the steel are rotatable out of alinement with the first mentioned openings for receiving them, and means forming a chuck rotatably supported in said chuck housing bore and connected to said chuck sleeve and having an outer bearing surface engaging the bore-walls rearwardly of said retaining and in advance of said chuck sleeve, said chuck-forming-means having portions projecting forwardly into said circular recess for limiting turning of said lugs about the axis of the drill steel and providing surfaces for limiting the angular movements of the lugs in said recess, and also having slots for receiving said lugs and holding said drill steel against substantial rotation in either direction relative to said chuck-forming-means.

8. In a rock drill mechanism, the combination with a lugged drill steel, of a rotatable member having an opening for receiving the shank and lugs of the drill steel, a recess within said member, circular in cross section, for receiving the steel lugs and within which the lugs are movable relative to said opening upon rotation of the drill steel, and a driver member for receiving and driving the shank of the drill steel and with which said rotatable member is rotatable, said driver member having grooves therein extending longitudinally thereof for receiving the lugs on predetermined rotation of the drill steel and holding the drill steel against substantial rotation relative to said rotatable member, and said driver member further having projections extending into said recess for limiting steel-rotation and for guiding the lugs into said grooves, and said rotatable member having rearward projections extending into said grooves outwardly of the positions adapted to be occupied by said lugs, for providing outer closures for the grooves.

9. In a chuck mechanism for supporting, rotating and retaining a lugged drill steel, the combination comprising a rotatable driver member having parallel projections, a bushing threadedly connected to said driver member and having a bore for receiving a drill steel shank, a locking member connected to said driver member for rotation therewith and having a front key opening and a circular recess, the lugs of a drill steel shank being insertible through said key opening into said recess and said steel being turnable to move said lugs laterally in said recess to bring the lugs out of registry with the key opening, and said projections on said driver member extending forwardly into said circular recess and providing stop surfaces for the lugs for limiting turning of the steel when the latter is in the chuck mechanism, said driver member having a bore and said bushing having a front circular portion in advance of the threaded connection between said bushing and said driver member and received in said bore.

JOHN C. CURTIS.